United States Patent
Date et al.

(10) Patent No.: US 10,364,812 B2
(45) Date of Patent: Jul. 30, 2019

(54) DOMESTIC APPLIANCE COMPRISING AN ACTUATOR

(75) Inventors: Milind Vishwas Date, Singapore (SG);
Kam Weng Choy, Singapore (SG);
Johannes Willem Tack, Zuidhom (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 506 days.

(21) Appl. No.: 14/233,323

(22) PCT Filed: Jul. 19, 2012

(86) PCT No.: PCT/IB2012/053678
§ 371 (c)(1),
(2), (4) Date: Jan. 16, 2014

(87) PCT Pub. No.: WO2013/011475
PCT Pub. Date: Jan. 24, 2013

(65) Prior Publication Data
US 2014/0270728 A1    Sep. 18, 2014

Related U.S. Application Data

(60) Provisional application No. 61/509,204, filed on Jul. 19, 2011.

(51) Int. Cl.
| | |
|---|---|
| *F16F 1/38* | (2006.01) |
| *F22B 1/28* | (2006.01) |
| *F04B 23/02* | (2006.01) |
| *F04B 39/12* | (2006.01) |
| *F04B 53/00* | (2006.01) |
| *F04B 53/16* | (2006.01) |

(Continued)

(52) U.S. Cl.
CPC ............ *F04B 53/003* (2013.01); *D06F 75/12* (2013.01); *D06F 75/40* (2013.01); *F04B 23/02* (2013.01);
(Continued)

(58) Field of Classification Search
CPC ........ F04B 53/16; F04B 23/02; F04B 53/003;
F04B 53/001; F04B 53/22; F04B 39/12;
F04B 39/121; F04B 39/127; F16F 1/373;
F16F 1/3732; F16F 1/3735; F16F 1/3828;
F16F 15/04; F16F 15/08; D06F 37/20
See application file for complete search history.

(56) References Cited

U.S. PATENT DOCUMENTS 2,018,180 A * 10/1935 Lawton ................... H02K 5/24
248/619
3,436,852 A    4/1969 Stansbury
(Continued)

FOREIGN PATENT DOCUMENTS

EP       0135484 B1    12/1988
JP       1986206141 U   6/1985

*Primary Examiner* — Bryan M Lettman

(57) ABSTRACT

A domestic appliance, such as a steam iron or a coffee making apparatus comprises a housing, a water reservoir, an actuator, and a boiler for providing hot water or steam for use by the appliance. In operation, a plunger pump of the actuator is reciprocating at the mains frequency, which introduces vibrations. To reduce undesired sound and noise from the vibrations, the domestic appliance further comprises a sub frame and a base frame, wherein the actuator is mounted on the sub frame and a resilient member is arranged between the sub frame and the base frame for moveably mounting the sub frame at the base frame.

10 Claims, 3 Drawing Sheets

(51) Int. Cl.
*F16F 1/373* (2006.01)
*F16F 15/08* (2006.01)
*D06F 75/12* (2006.01)
*D06F 75/40* (2006.01)

(52) U.S. Cl.
CPC .......... *F04B 39/121* (2013.01); *F04B 39/127* (2013.01); *F04B 53/16* (2013.01); *F16F 1/3735* (2013.01); *F16F 1/3828* (2013.01); *F16F 15/08* (2013.01); *F22B 1/285* (2013.01)

(56) References Cited

U.S. PATENT DOCUMENTS

| | | | |
|---|---|---|---|
| 4,858,880 A * | 8/1989 | Durand | B60G 99/004 248/635 |
| 5,649,812 A * | 7/1997 | Schoenmeyr | F04B 43/0054 248/628 |
| 6,912,865 B2 * | 7/2005 | Seo | F16F 1/3732 181/207 |
| 7,000,342 B2 | 2/2006 | Chen | |
| 7,416,244 B2 * | 8/2008 | Polk | B62D 33/0604 248/638 |
| 2002/0015647 A1 | 2/2002 | Nakagaki et al. | |
| 2006/0216165 A1 | 9/2006 | Lee | |
| 2007/0157821 A1 * | 7/2007 | Panesar | A47J 31/0673 99/279 |
| 2007/0177994 A1 * | 8/2007 | Suh | F04C 18/0215 417/363 |
| 2008/0230676 A1 * | 9/2008 | Hansemann | F16F 1/3732 248/634 |
| 2010/0107887 A1 * | 5/2010 | Bentley | A47J 31/44 99/288 |
| 2012/0098253 A1 * | 4/2012 | Folcarelli | B29C 45/14614 285/240 |

* cited by examiner

DOMESTIC APPLIANCE COMPRISING AN ACTUATOR

CROSS-REFERENCE TO PRIOR APPLICATIONS

This application is the U.S. National Phase application under 35 U.S.C. § 371 of International Application No. PCT/IB2012/053678, filed on Jul. 19, 2012, which claims the benefit of U.S. Provisional Patent Application No. 61/509,204, filed Jul. 19, 2011. These applications are hereby incorporated by reference herein.

FIELD OF THE INVENTION

The invention relates to a domestic appliance comprising a base frame and an actuator connected to the base frame.

BACKGROUND

Domestic appliances such as a coffee making machine or a steam iron for garment care are used by a user to facilitate coffee making and ironing respectively.

EP-0135484 discloses a steam iron comprising a sole plate, a water reservoir and a boiler wherein the plunger pump is arranged to pump water from the water reservoir to a steam generator.

In operation, for example in case a user applies steam to a garment, the actuator, i.e. the plunger pump reciprocally moves the plunger to pump water from the water reservoir to the boiler, which in turn delivers steam to the garment. The operating plunger pump in the steam iron or coffee making apparatus generates sound and vibration which can be annoying to the user of the domestic appliance and people present in the environment of the user, and is not user friendly.

SUMMARY OF THE INVENTION

It is therefore an object of the invention to provide a domestic appliance that, in operation, has a reduced level of sound and vibration.

According to the invention this and other objects are achieved by a domestic appliance comprising a base frame, an actuator connected to the base frame, the actuator being provided with a drive member, the actuator being arranged for reciprocating movement of the drive member, wherein the domestic appliance further comprises a sub frame and a resilient member, whereby the actuator is mounted on the sub frame and the resilient member is arranged between the sub frame and the base frame for moveably mounting the sub frame at the base frame. The base frame may comprise, for example a housing. The actuator can be, for example, a plunger or piston pump or a diaphragm pump. The drive member may be a reciprocating plunger.

In general, noise originating from the domestic appliance can be deduced to air born noise and structure born noise. By reducing the transmission of the vibrating energy induced by the actuator to the base frame of the domestic appliance, the structure born noise can be substantially reduced.

In this arrangement the vibration energy of the actuator is stored as kinetic energy in the moving sub frame, so that the transmission of vibrations induced by the actuator to the base frame is reduced, and hence structure born noise is reduced, resulting in a lower sound level of the domestic appliance.

The transmission of the vibrations induced by the reciprocating actuator to the base frame via the resilient member and the sub frame can be modeled, in first instance, through the formula $F = m \cdot a$; wherein F represents the driving force, m represents the total mass of the sub frame, and a represents the acceleration of the sub frame.

By increasing the mass or inertia of the sub frame the acceleration of the sub-frame and thus the force is reduced that is exerted on the base frame.

The cited document EP-0135484 discloses a steam iron wherein the piston pump is supported by two spaced rubber flanges to reduce the sound level of the reciprocating piston pump. In that arrangement the rubber flanges are absorbing energy and are still transmitting reduced vibrations from the piston pump to the frame. Furthermore that document does not disclose a sub frame.

In a further embodiment of the domestic appliance the resilient member is constructed and arranged to allow a lateral movement and/or a rotation of the sub frame around an axis of rotation transverse to the plane of the base frame.

In a still further embodiment of the domestic appliance the axis of rotation is through a centre of gravity of the sub frame comprising the actuator. In this arrangement the dynamic load is symmetric with respect to the supports.

In a still further embodiment the resilient member comprises at least one elastomer mount. In an embodiment the mounts are distributed such that the weight of the sub frame is evenly distributed over three or four rubber or elastomer mounts.

In a further embodiment of the domestic appliance, the domestic appliance comprises a boiler for water heating or steam generation mounted at the sub frame. In alternative embodiments a flow-through heater may be provided instead of said boiler. In the following the boiler and the flow-through heater are considered as equivalents. It is perceived that other water heating arrangements may be implemented as well. To such other water heating arrangements the following applies mutatis mutandis. In such arrangements the mass of the boiler or the flow-through heater adds to the mass of the sub frame. By adding more weight to the sub frame the acceleration induced by the actuator will be smaller, the transmitted vibrations in the base frame will also be smaller due to the flexible suspension and less sound is radiated from the base frame and the attached components/housing.

In a further embodiment of the domestic appliance, the actuator is operationally connected to the boiler or the flow-through heater via a high pressure resistant tube. In this arrangement ideally the vibrations of the boiler, or alternatively the flow-through heater, and the actuator are identical in amplitude and phase.

So, in case the actuator is a plunger pump, the high pressure resistant tube connected from an outlet of the plunger pump to the boiler is then stationary with respect to the boiler and the pump, whereas in a conventional appliance the boiler is positioned on the base frame, which may lead to leakage of the tube and generating of noise from the vibrating tube.

In a still further embodiment of the domestic appliance, the domestic appliance further comprises a water reservoir provided at the sub frame, the water reservoir being operationally connected to the actuator via a flexible tube. Also in this arrangement more mass or inertia is added to sub frame and the acceleration of the sub frame induced by the actuator becomes smaller.

In a still further embodiment of the domestic appliance the water reservoir is detachably mounted to the sub frame. This arrangement allows easy refilling of the water reservoir by detaching the water reservoir from the sub frame.

In a still further embodiment of the domestic appliance, the flexible tube comprises a corrugated tube. The corrugated tube is more flexible and reduces the transmission of vibration from the actuator to base frame via the corrugated tube and the water reservoir.

In a still further embodiment of the domestic appliance, the actuator is a plunger pump or diaphragm pump.

These and other features and effects of the present invention will be explained in more detail below with reference to drawings in which a preferred and illustrative embodiments of the invention are shown.

The person skilled in the art will realize that other alternatives and equivalent embodiments of the invention can be conceived and reduced to practice without departing from the scope of the present invention.

DETAILED DESCRIPTION OF EMBODIMENTS

In the figures like numbers refer to similar components.

Figure 1:
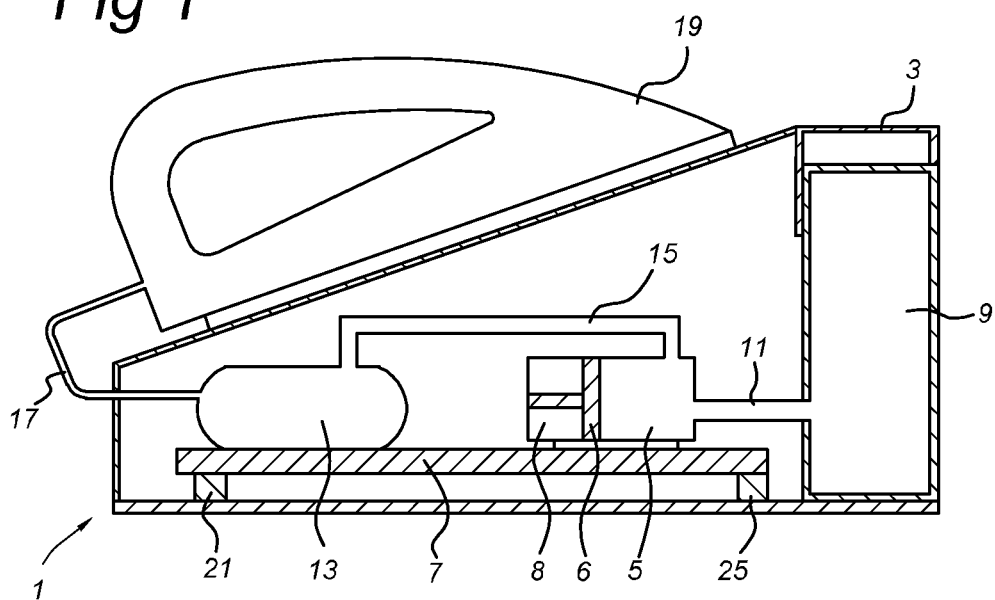
FIG. 1 shows a schematic illustration of a steam iron.

FIG. 1 shows a steam iron comprising a base frame, for example a housing 3, an actuator and a rigid sub frame 7. The actuator may be a plunger pump 5 connected to the housing 3 via the rigid sub frame 7. The rigid sub frame 7 can be a rectangular steel plate or enforced plastic plate. The steam iron 1 may be provided with a water reservoir 9 detachably mounted at the housing 3. An outlet of the water reservoir 9 is connected to an inlet of the plunger pump 5 via a flexible tube or corrugated tube 11. Furthermore, the steam iron 1 may comprise a boiler 13 for heating water or generating of steam. An inlet of the boiler 13 is connected to an outlet of the plunger pump 5 via a high pressure resistant tube 15. An outlet of the boiler 13 is connected to an iron 19 via a further high pressure tube 17 for providing steam to the iron 19. The plunger pump 5 comprises a solenoid 8 and a plunger 6 cooperating with the solenoid. In operation, the plunger pump 5 is usually reciprocating at the mains frequency, for example 50 or 60 Hz.

The steam iron 1 further comprises a resilient member, for example elastomer mounts, 21,23, 25,27 whereby the plunger pump 5 is mounted on the sub frame 7 and the sub frame 7 is moveably mounted at the housing 3 via the elastomer mounts 21,23,25,27. The elastomer mounts 21,23, 25,27 allow a lateral movement and/or a rotation of the subframe around an axis perpendicular to the sub frame 7.

Figure 2:
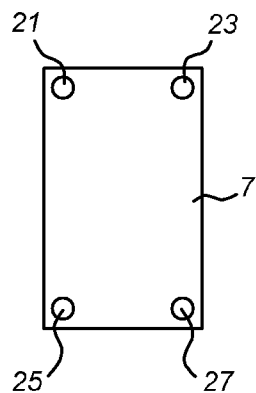
FIG. 2 shows a schematic illustration of an arrangement of the elastomer mounts on the sub frame of the steam iron.

FIG. 2 shows a cross section of the sub frame 7 and the arrangement of the elastomer mounts 21, 25, 23,27. The four elastomer mounts 21, 25, 23,27 are positioned at the respective corners of the rigid sub frame 7.

Figure 3:
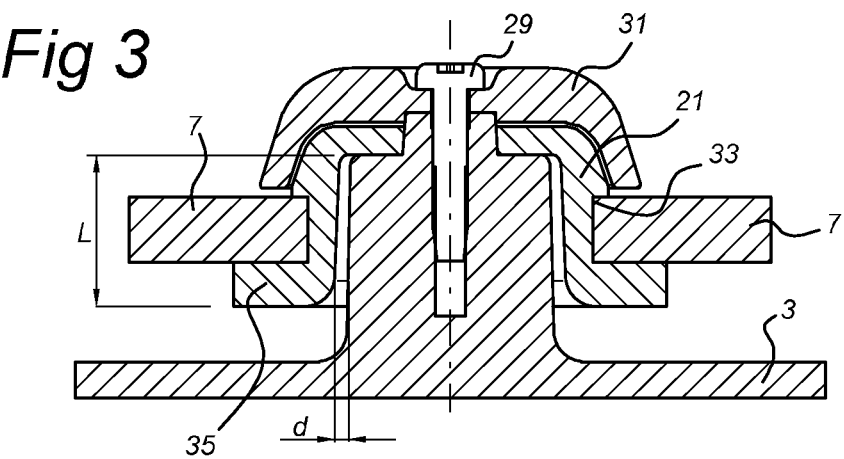
FIG. 3 shows a schematic illustration of a cross-section of an elastomer mount for the steam iron.

FIG. 3 shows a detailed cross-section of one of the elastomer mounts 21,23,25 and 27. The elastomer mount 21 can be disc shaped and is mounted via a connecting member, for example, a screw 29 in the center of the mount 21 to the base frame 7. The elastomer mount 21 is provided with a cap 31 to prevent that the screw 29 is pushed through the elastomer mount 21 due to large forces on the elastomer mount 21, for example during shock tests. The cap may be made of a polymer.

The material of the elastomer mounts 21,23,25 and 27 may comprise a synthetic material like Ethylene Propylene Diene Monomer (EPDM) or Nitrile Polymer Rubber (NPR) of mid-range hardness (50-50 Sh-A).

A part of the synthetic material may be removed from the interior of the disc 21 to allow sufficient deflection in an x, y direction or a rotation in the plane of the sub frame 7.

The sub frame 7 of the steam iron rests on a portion 35 of the elastomer mount 21. The length L of the portion 35 of the elastomer mount 21 between a point where on the elastomer mount 21 rests on the housing 3 and a point of the elastomer mount whereon the sub frame 7 rests, determines a maximum swing of this portion and a horizontal movement related to this swing of the sub frame 7 within the housing 3. The distance d along a horizontal cross-section between a side of the elastomer mount 21 and the housing 3 should be sufficiently large to allow the horizontal movement of the sub frame 7 within the housing 3 without bouncing to the housing. In an embodiment the length L is 1 cm and the distance d is 1 mm.

In this arrangement the transmission of the vibrations from the reciprocating plunger pump 5 to the housing 3 are substantially reduced and hence structure born noise induced by the housing 3 is reduced.

By increasing the mass of the sub frame 7 by mounting the water reservoir 9 and the boiler 13, the sub frame acceleration is reduced and the transmitted vibrations to the housing are reduced. The system of sub frame and elastomer mounts can be further modeled as the strings in a pendulum system. The natural frequency fn of such pendulum system can then be given by $$fn = 1/(2\pi\sqrt{L/g})$$

wherein L represents the length of the portion 35 of the elastomer mount 21 between a point where on the elastomer mount 21 rests on the frame 3 and a point of the elastomer mount whereon the sub frame 7 rests, and g represents the gravitation constant.

Furthermore, the boiler 13 for water heating or steam generation is mounted at the sub frame 7. The advantage of this arrangement is that the mass of the boiler 13 adds to the mass of the sub frame 7. By adding more weight to the sub frame 7 the acceleration of the sub frame 7 induced by the reciprocating plunger will be smaller and the transmission force on the housing will be reduced.

A further advantage of this arrangement is that ideally the boiler 13 and the plunger vibrations are identical in amplitude and phase, and the high pressure tube 15 connected from the outlet of the plunger pump 5 to the boiler 13 is stationary with respect to the boiler 13 and the pump 5, resulting in less wear in the high pressure tube 15, which wear may lead to leakage of the tube. Furthermore, in this arrangement the stationary high pressure tube 15 is exposed to less vibration and radiates less noise.

In an embodiment the mass and shape of the plunger pump 5, the boiler 13 and the sub frame 7 may be dimensioned and arranged at the sub frame 7 such that the center of gravity is coincident with the crossing of a vertical axis of rotation and the sub frame the dynamic load on the subframe is then symmetrically with respect to the elastomer mounts 21,23,25 and 27.

Figure 4:
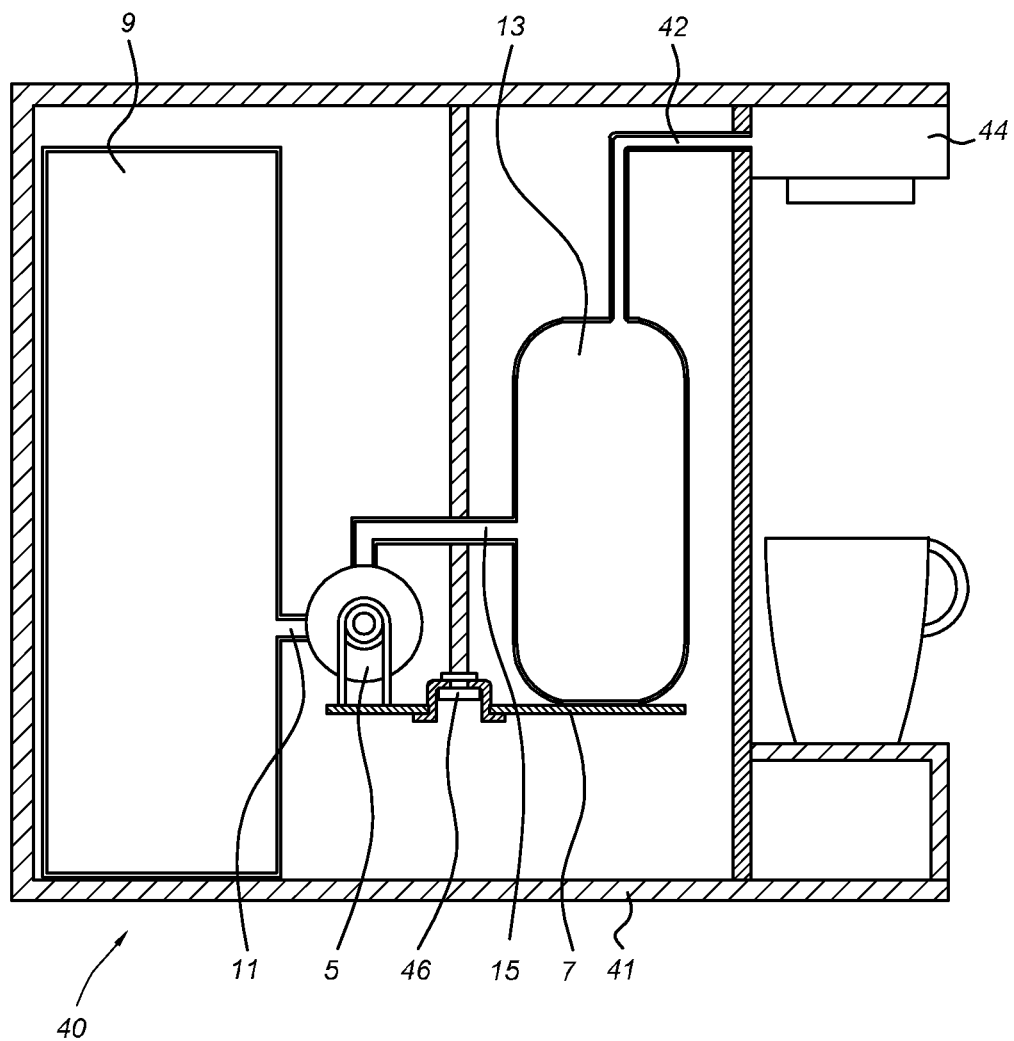
FIG. 4 shows a schematic illustration of a coffee making apparatus.

FIG. 4 shows a coffee making apparatus 40 comprising a base frame, for example, a housing 41, an actuator and a rigid sub frame 7. The actuator may comprise a plunger pump 5 connected to the housing 41 via the rigid sub frame 7. The coffee making apparatus 40 may be provided with a water reservoir 9 detachably mounted in the housing 41, an outlet of the water reservoir 9 is connected to an inlet of the plunger pump 5 via a low pressure tube or corrugated tube 11. Furthermore, the coffee making apparatus 40 comprises a boiler 13 for heating water. The boiler 13 is mounted on the rigid sub frame 7. An inlet of the boiler 13 is connected to an outlet of the plunger pump 5 via a high pressure resistant tube 15. An outlet of the boiler 13 is connected to a coffee pad holder 44 via a tube 42 for dispensing hot water. In operation, the plunger pump 5 is usually reciprocating at the mains frequency, for example 50 or 60 Hz.

The coffee making apparatus 40 further comprises a resilient member, for example, an elastomer mount 46 for reducing transmission of vibrations from the plunger pump 5 to the housing 41. The plunger pump 5 is mounted on the sub frame 7 and the sub frame 7 is moveably mounted at a rod in the housing 41 via the elastomer mount 46. The elastomer mount 46 can be arranged in the center of the sub frame 7. The elastomer mount 46 allow a lateral movement and/or a rotation of the subframe around an axis perpendicular to the sub frame 7.

Dimensioning of the elastomer mount 46 and the sub frame 7 for reduction of transmission of vibrations of a reciprocating plunger 8 to the housing 41 via the sub frame 7 is explained above in relation with the embodiment described in relation with FIG. 2.

Figure 5:
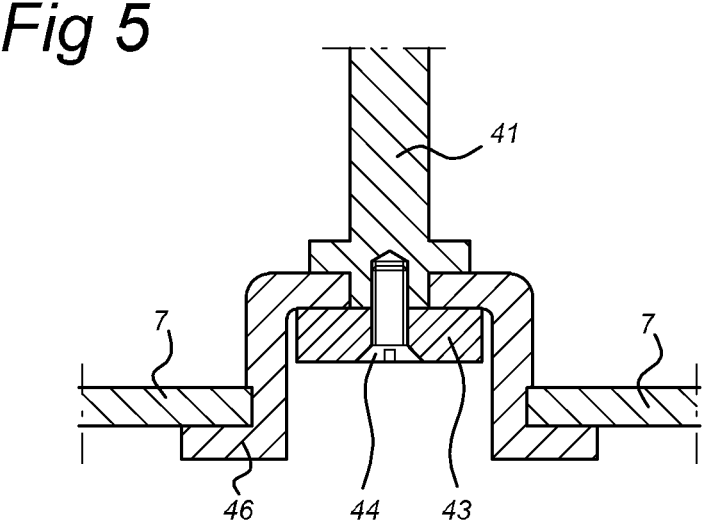
FIG. 5 shows a schematic illustration of an elastomer mount for a coffee making apparatus.

FIG. 5 shows a cross section of the elastomer mount 46 for use in the coffeemaking apparatus 40. The elastomer mount 46 is connected to the housing via a cap 43 and a screw 44. The elastomer mount 46 may comprise a synthetic material like Ethylene Propylene Diene Monomer (EPDM) or Nitrile Polymer Rubber (NPR) of mid-range hardness (50-50 Sh-A).

In the above described embodiments of the steam iron 1 and the coffee making apparatus 40 the plunger pump 5 may be replaced by a diaphragm pump.

Although illustrative embodiments of the present invention have been described with reference to the accompanying drawings, it is to be understood that the invention is not limited to these embodiments. Various changes or modifications may be effected by one skilled in the art without departing from the scope or the spirit of the invention as defined in the claims. Accordingly, reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that the particular features, structures, or characteristics may be combined in any suitable manner in one or more embodiments.

The invention claimed is:

1. A domestic appliance comprising:
   a base frame;
   an actuator provided with a drive member and arranged for reciprocating movement of the drive member;
   a rigid sub frame, wherein the actuator is mounted on the rigid sub frame; and
   a resilient member that comprises at least one elastomer mount arranged between the rigid sub frame and the base frame for moveably mounting the rigid sub frame at the base frame, wherein an interior portion of the at least one elastomer mount is constructed and arranged to allow both (i) deflection in an x,y direction for lateral movement of the rigid sub frame in a plane parallel to the base frame and (ii) rotation in a plane of the rigid sub frame for rotation of the rigid sub frame around an axis of rotation transverse to the plane of the base frame, wherein the at least one elastomer mount further comprises a disc shaped elastomer mount and the interior portion comprises the disc shaped elastomer mount with a portion of material removed from an interior of the disc shaped elastomer mount of a length L, between a first point of the elastomer mount where the elastomer mount rests on the base frame and a second point of the elastomer mount where on the rigid sub frame rests, and in which a distance d along a horizontal cross-section, between a side of the elastomer mount and the base frame, is sufficiently large, together with length L, allows both (i) the deflection of the disc shaped elastomer mount in the x,y direction and (ii) the rotation of the disc shaped elastomer mount in the plane of the rigid sub frame.

2. The domestic appliance according to claim 1, wherein the axis of rotation is through a center of gravity of a mass and shape of the rigid sub frame and the actuator.

3. The domestic appliance according to claim 1, wherein the domestic appliance further comprises a boiler or a flow-through heater for water heating or steam generation mounted at the rigid sub frame.

4. The domestic appliance according to claim 3, wherein the actuator is operationally connected to the boiler or the flow-through heater via a pressure resistant tube.

5. The domestic appliance according to claim 1, wherein the domestic appliance further comprises a water reservoir provided at the rigid sub frame, the water reservoir being in fluid communication with the actuator via a flexible tube.

6. The domestic appliance according to claim 5, wherein the water reservoir is detachably mounted to the rigid sub frame.

7. The domestic appliance according to 7, wherein the flexible tube comprises a corrugated tube.

8. The domestic appliance according to claim 1, wherein the actuator comprises a plunger pump or a diaphragm pump.

9. The domestic appliance according to claim 1, wherein the disc shaped elastomer mount is adapted to be mounted via a connecting member in a center of the disc shaped elastomer mount to the base frame, and further wherein the length L determines a maximum swing of the interior portion and a horizontal movement related to the swing of the sub frame with respect to the base frame.

10. The domestic appliance according to claim 9, further wherein the disc shaped elastomer mount is further provided with a cap overlying a portion of the disc shaped elastomer mount, wherein the cap is adapted to prevent the connecting member from pushing through the disc shaped elastomer mount due to forces exerted on the disc shaped elastomer mount.

* * * * *